US012617651B2

(12) United States Patent
Flores

(10) Patent No.: US 12,617,651 B2
(45) Date of Patent: May 5, 2026

(54) LINE SENSOR DEPLOYMENT AND RECOVERY APPARATUS AND SYSTEM WITH INTEGRATED LEVEL-WIND

(71) Applicant: The United States of America as represented by the Secretary of the Navy, San Diego, CA (US)

(72) Inventor: Geno Christopher Flores, La Mesa, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 315 days.

(21) Appl. No.: 18/543,985

(22) Filed: Dec. 18, 2023

(65) Prior Publication Data

US 2025/0197162 A1 Jun. 19, 2025

(51) Int. Cl.
| | |
|---|---|
| *B65H 75/44* | (2006.01) |
| *B63B 27/36* | (2006.01) |
| *G01D 11/06* | (2006.01) |

(52) U.S. Cl.
CPC ......... *B65H 75/4407* (2013.01); *B63B 27/36* (2013.01); *B65H 75/4415* (2013.01); *B65H 75/4481* (2013.01); *G01D 11/06* (2013.01); *B65H 2701/30* (2013.01)

(58) Field of Classification Search
None
See application file for complete search history.

(56) References Cited

U.S. PATENT DOCUMENTS

| | | | |
|---|---|---|---|
| 7,717,402 B2 * | 5/2010 | Mann | B66D 1/7426 |
| | | | 254/326 |
| 2020/0354201 A1 * | 11/2020 | Hall | B66D 1/365 |

* cited by examiner

*Primary Examiner* — Suman K Nath
(74) *Attorney, Agent, or Firm* — Naval Information Warfare Center Pacific; Kyle Eppele

(57) ABSTRACT

A line sensor deployment and recovery apparatus and system with integrated level-wind. In one embodiment, a line deployment and recovery apparatus with an integrated level-wind, comprising a reel, having an external surface with helical grooves, wherein the grooves facilitate a line; a motor configured to axially rotate the reel; a level-wind shuttle, further comprising: a fairlead configured to selectively feed the line into the helical grooves, or deploy the line from the helical grooves; a shuttle finger configured to align the shuttle with the helical grooves and receive a driving force from the reel's rotations to drive the shuttle; and a shuttle track, oriented parallel to the drum and fixed in a offset position form the helical grooves at an operable track height, configured to facilitate linear traversal of the shuttle along the reel.

20 Claims, 5 Drawing Sheets

110

140

130

100

200

120

130

110

LINE SENSOR DEPLOYMENT AND RECOVERY APPARATUS AND SYSTEM WITH INTEGRATED LEVEL-WIND

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwe_patent.fct@us.navy.mil, referencing Navy Case No. 114,055.

BACKGROUND

Level-winds are devices and systems that facilitate the winding of a line evenly onto a cylindrical drum. One example, for illustrative purpose, is a fishing cylindrical drum where the fishing line may be wound and unwound through the level-wind to provide efficient and reliable performance. However, level-winds are often used beyond fishing cylindrical drums for other linear and flexible assemblies. For example, lines or tubes have embedded lights, sensors, or antenna components may also require level-winds for reliable and efficient spooling onto a cylindrical drum.

Typically, level-winds utilizes multiple motors or drive systems. One motor is commonly needed to wind the line, tube, or system onto the cylindrical drum. Additionally, a motor is needed to slide the level-wind's feed, which lays the line uniformly on the cylindrical drum, along the length of the cylindrical drum. Accordingly, level-winds utilize multiple, complex drive systems that not only add size, weight, and power requirements to the complete system but also reduce efficiency and reliability. Therefore, a solution is needed that reduces complexity and improves reliability.

SUMMARY

According to illustrative embodiments, a line deployment and recovery apparatus with an integrated level-wind, comprising a reel, having an external surface with helical grooves, wherein the grooves facilitate a line; a motor configured to axially rotate the reel; a level-wind shuttle, further comprising: a fairlead configured to selectively feed the line into the helical grooves, or deploy the line from the helical grooves; a shuttle finger configured to align the shuttle with the helical grooves and receive a driving force from the reel's rotations to drive the shuttle; and a shuttle track, oriented parallel to the drum and fixed in a offset position form the helical grooves at an operable track height, configured to facilitate linear traversal of the shuttle along the reel.

Additionally, a sensor deployment and recovery apparatus with an integrated level-wind, comprising a cylindrical drum, having an external surface with helical grooves, wherein the grooves facilitate a linear sensor array; a single motor configured to axially rotate the cylindrical drum, wherein the single motor is the only motor providing level-wind functionality; a level-wind shuttle, further comprising: a fairlead configured to selectively feed the linear sensor array into the helical grooves or deploy the linear sensor array from the helical grooves, a shuttle finger configured to align the shuttle with the helical grooves and receive a driving force from the cylindrical drum's rotations to drive the shuttle; and a shuttle track, oriented parallel to the drum and fixed in a offset position form the helical grooves at an operable track height, configured to facilitate linear traversal of the shuttle along the cylindrical drum.

Additionally, a sensor deployment and recovery system with an integrated level-wind, comprising: a linear sensor array; a cylindrical drum, having an external surface with helical grooves, wherein the grooves facilitate the linear sensor array; a single motor configured to axially rotate the cylindrical drum; a level-wind shuttle, further comprising: a fairlead configured to selectively feed the line into the helical grooves or deploy the line from the helical grooves, a shuttle finger configured to align the shuttle with the helical grooves and receive a driving force from the cylindrical drum's rotations to drive the shuttle; and a shuttle track, oriented parallel to the drum and fixed in a offset position form the helical grooves at an operable track height, configured to facilitate linear traversal of the shuttle along the cylindrical drum.

It is an object to provide a line sensor deployment and recovery apparatus and system with integrated level-wind that offers numerous benefits, including reducing size, weight, and power for the overall system while reducing complexity. This reduction in complexity will create an inherently more reliable system.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed system and apparatus below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other system and apparatus described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise.

Additionally, as used herein, the term "line," is intended to cover any linear, flexible material that may include tubes, linear arrays, sensor arrays, embedded electronics, or any system capable of being winded.

Figure 1:
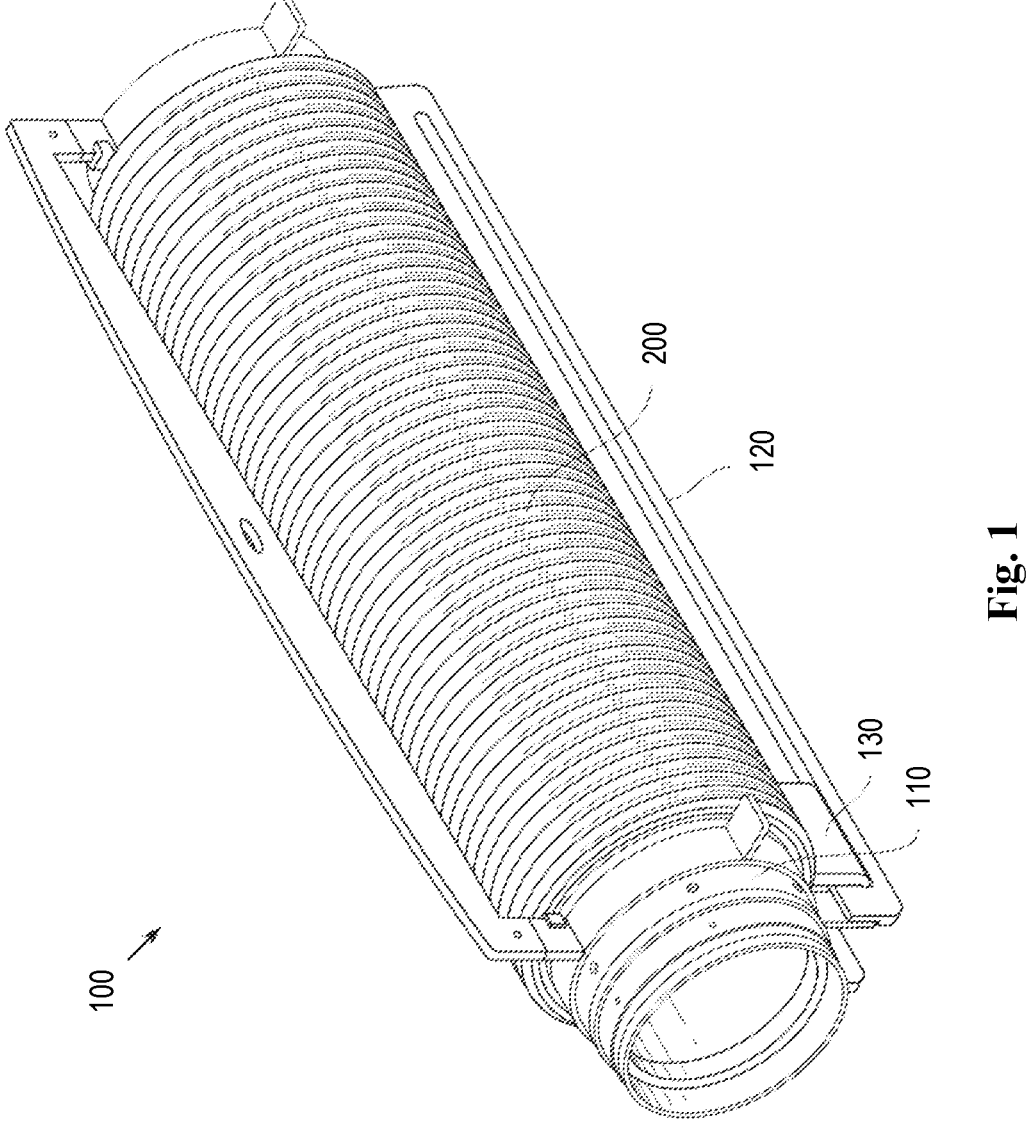
FIG. 1 is an isometric illustration of a deployment and recovery apparatus/system with an integrated level-wind.
Figure 2:
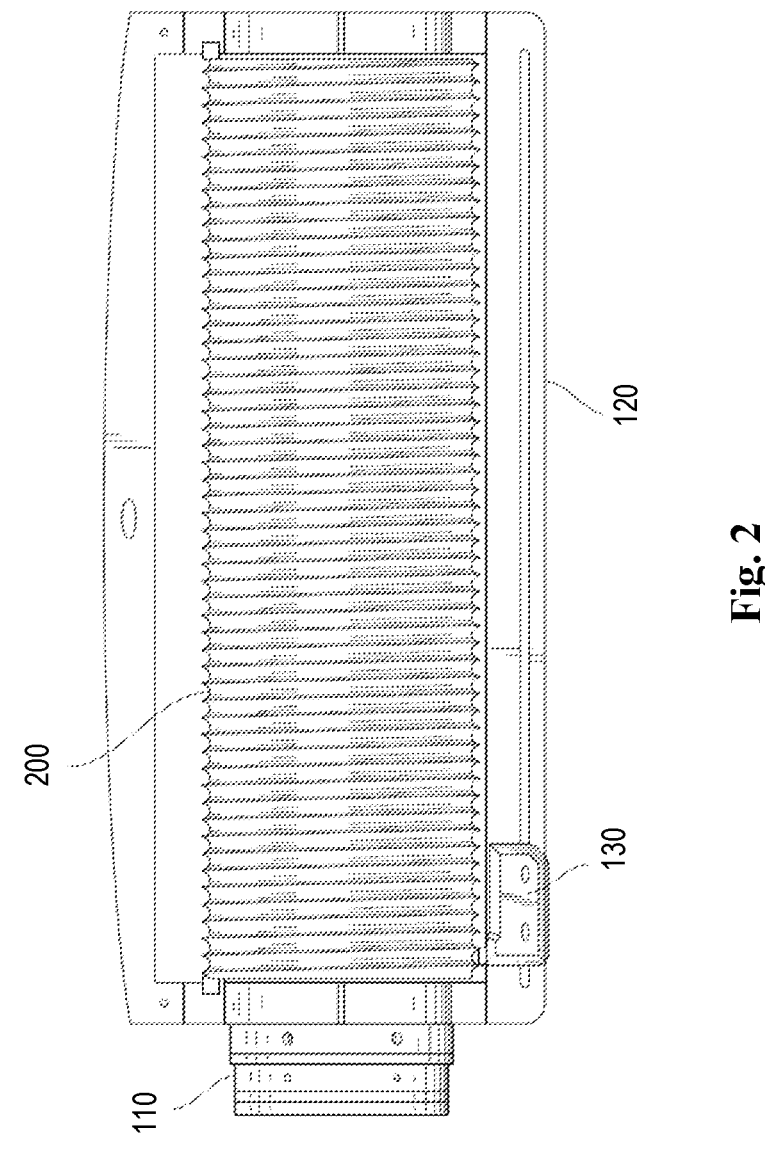
FIG. 2 is a side-profile illustration of a deployment and recovery apparatus/system with an integrated level-wind.

FIG. 1 is an isometric illustration and FIG. 2 is a side-profile illustration of a deployment and recovery apparatus/system 100 with an integrated level-wind comprising, consisting of, or consisting essentially of a reel 110, a motor 140, a shuttle 130, and a shuttle track 120. This apparatus/system 100 may further comprises a line 200 or sensor array 200. The reel 110 is operably coupled to the motor to axially rotate the reel around its center axis. Rotating the reel 110 winds a line 200 into helical groves 111 inscribed into the reel 200. In some embodiments, the helical groove 111 may be one continuous groove, while in others, there may be multiple grooves 111. The line 200 is "spooled" or "wound" via a shuttle 130 that lays the line into the helical groove 111 that is driven by the helical grooves 111 inscribed on the drum. In other words, the line is fed into the helical groove 111 or deployed away from the reel through a fairlead 132. A shuttle track 120 is a mechanism that permits sliding of the shuttle in a direction parallel to the reel 110. The deployment and recovery apparatus/system 100 with an integrated level-wind may be used, but is not limited to, aquatic and terrestrial environments.

The reel 110 comprises, consists of, or consists essentially of an external wall with helical grooves 111. In one embodiment, the reel 110 is a cylindrical drum with helical grooves 111. In a further embodiment, the helical grooves 111 are inscribed onto the outside of the drum. The helical grooves 111 have a trough 112 that is defined by the cavity of the groove. The trough 112 is configured to nest a line or sensor array in the groove. As the reel rotates, the line 200 is wound into the helical grooves 111 by the shuttle, which guides the line into the appropriate, nested position.

Figure 3:
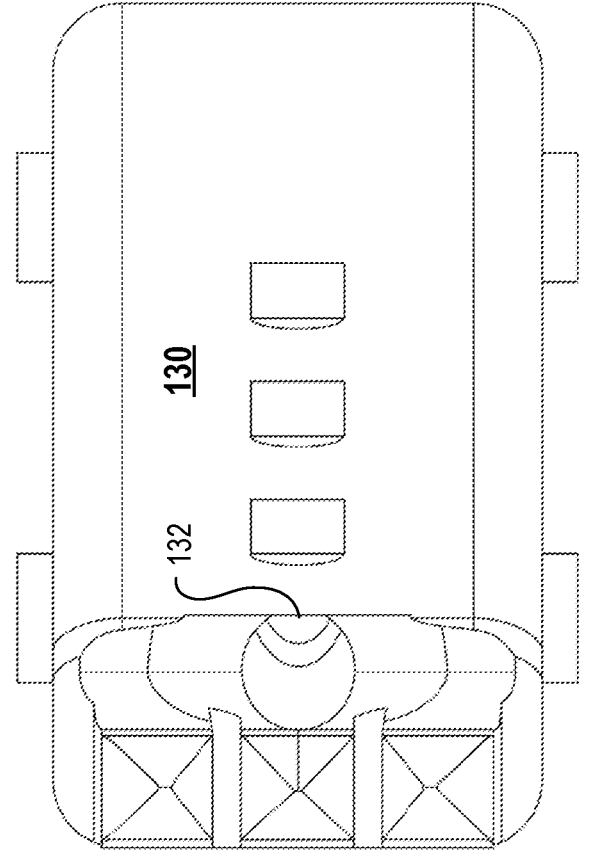
FIG. 3 is a top-view illustration of a shuttle.

FIG. 3 is a top-view illustration of a shuttle 130. The shuttle 130 comprises a finger 131 and a fairlead 132, and is operable to slide along shuttle 130 track. As shown in FIG. 3, the fairlead 132 may be an opening in the shuttle 130 in which the line may pass through. As the reel 110 or cylindrical drum rotates, the shuttle 130 is driven along the shuttle track 120 while maintaining an interface with the helical grooves 111. In one embodiment, the driving along the track 120 may be enabled by wheels coupled to the shuttle.

Figure 4:
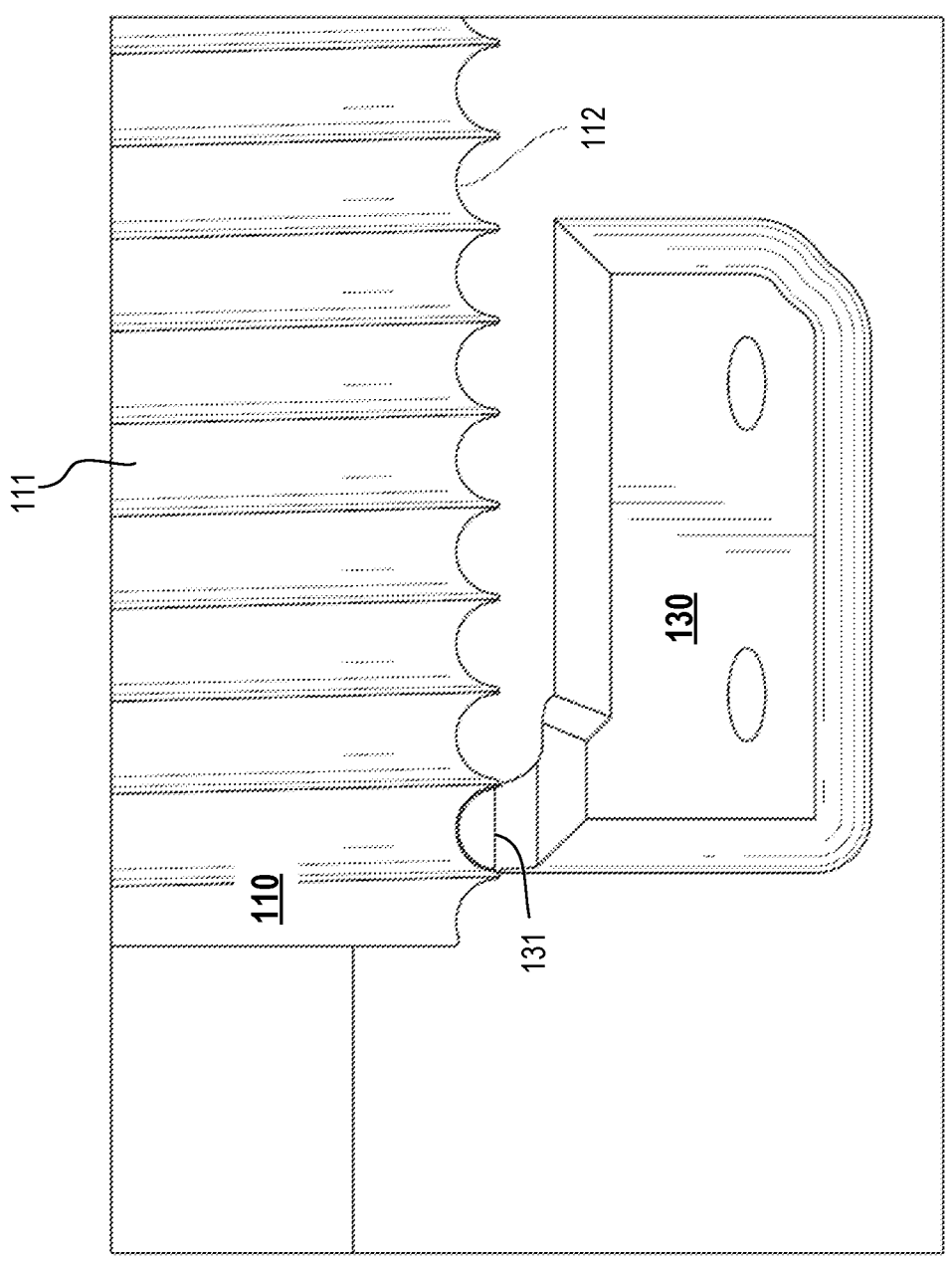
FIG. 4 is an illustration of the shuttle interfacing with the helical grooves of the cylindrical drum.

FIG. 4 is an illustration of the shuttle 130 interfacing with the helical grooves 111 of the cylindrical drum 110. The shuttle 130 interfaces with the helical groove 111 of the helical groove via a finger 131. The trough 112 is defined by the shape of the helical groove 111, as shown in FIG. 4. The finger 131 also sits in the trough 112 and may receive a force from the wall of the helical groove 111 to push the shuttle 130 along the track 120 as the reel 111 is rotated. In FIG. 4, the interface of the shuttle finger 131 and helical groove 111 is highlighted with a thick black line. In one embodiment, the finger 131 is the shape of a round nub. In an additional embodiment, the finger 131 is pitched at an angle that matches the pitch of the helical grooves 111. Matching the pitch minimizes friction and smooths the driving of the shuttle 130. As the drum 110 rotates, the shuttle 130 may selectively pick up or lay down the line with a fairlead 132. The fairlead 132 guides the deployment or recovery of the line as the cylindrical drum 110 rotates. In one direction, the fairlead 132 picks up the line from the helical grooves 111 and guides the line 200 away for deployment. Upon recovery, the reel 110 is wound in the opposite direction to spool the line 200, where the fairlead lays the line into the empty grooves 111.

Because the shuttle finger 131 directly interfaces with the helical groove, only one line can be laid in each groove 111. In other words, the spooling of the line 200 can only be a single layer. Therefore, the maximum length of the line 200 or sensor array that can be laid in the groove is equivalent to one length of the helical grooves 111.

Additionally, the shuttle 130 also a fairlead that selectively lays the line into the helical groove 111. The shuttle 130 further comprises a line feed, which is capable of picking up the line out of the helical grooves 111 or laying the line 200 into the groves. The fairlead 132 is shown in FIG. 3, which includes pass-through hole in the shuttle 130. In some embodiments, the fairlead 132 is carefully positioned to lay the line (i.e. spool) in to a particular through of the helical groove. That particular trough may be behind the shuttle finger 131, in terms of the direct the shuttle 130 is being driven. Additionally, the fairlead lifts 132 the line from a particular helical trough 112 ahead of the shuttle finger while unspooling. In some embodiments, the axial rotation of the reel 110 is sufficient to push the line through the fair lead 132.

The shuttle track 120 runs parallel to the drum and facilitates traversal of the shuttle 130. In one embodiment, the shuttle track 120 is approximately the length of the reel or cylindrical drum 110. The shuttle track 120 may be coupled to the drum 110, but is not so limited. Furthermore, the shuttle 130 is positioned at a fixed offset from the helical grooves 111, wherein the offset allows the shuttle 130 to run clear of interference with the wound line 200 while, simultaneously, maintain an interface between the trough 112 and shuttle finger 131. This offset distance between the helical grooves 111 and track position may be referred to as "operable track height".

Figure 5:
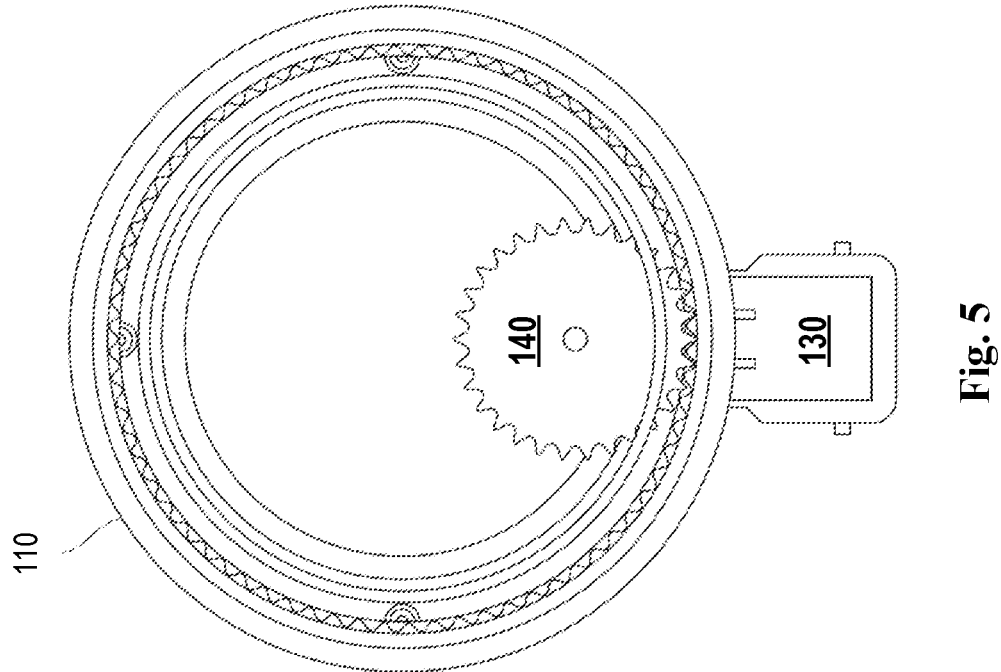
FIG. 5 is an illustration of the motor configured to axially rotate the reel or cylindrical drum.

FIG. 5 is an illustration of the motor 140 configured to axially rotate the reel or cylindrical drum 110. In one embodiment, the motor 140 interfaces with the cylindrical drum 110 via a rotatable gear, as shown in FIG. 5. Uniquely, the instant disclosure enables the use of only a single motor 140 to provide level-wind functionality. Previous solutions utilizes at least two motors; typically, one to wind the reel and another to drive the shuttle. Two motors not only add more size, weight, and power requirements, but also decrease reliability. The single motor 140 may be located inside the reel or cylindrical drum 110, as shown in FIG. 5.

However, another embodiment may be where the motor 140 is external. In either embodiment, the motor 140 may interface with the drum mechanism via interlocking teeth. Where previous designs required at least two motors to operate the level-wind, this single motor 140 simultaneously winds the reel 110, drives the shuttle 130 along the track 120, and feed the line into the helical groove or deploy the line. As described previously, this movement along the track is facilitated by a shuttle finger receiving a driving force from directly interfacing with the track.

The system may further comprise, consist of, or consist essentially of a line 200 capable of being wound into the reel 110 and, moreover, the grooves 111 of the reel. In one embodiment, the line may be a sensor array 200. A sensor array 200 is a linear, flexible system that may be wound around a reel and has embedded electronics. The embedded electronics may include electronics that collect/sense information. In another embodiment, the line may be an antenna. In one embodiment, these sensors may be deployed in aquatic environments.

The deployment and recovery apparatus/system 100 with an integrated level-wind may further comprise, consist of, or consist essentially of a floatation device. The foam float may provide buoyancy in submerged applications. In one embodiment, the float may comprise foam. Furthermore, the float may be coupled to the reel or cylindrical drum 110.

From the above description of line sensor deployment and recovery apparatus and system with integrated level-wind, it is manifest that various techniques may be used for implementing the concepts of a line deployment and recovery apparatus with an integrated level-wind, a sensor deployment and recovery apparatus with an integrated level-wind, and line deployment and recovery system with an integrated level-wind without departing from the scope of the claims. The described embodiments are to be considered in all respects as illustrative and not restrictive. The system and apparatus disclosed herein may be practiced in the absence of any element that is not specifically claimed and/or disclosed herein. It should also be understood a line deployment and recovery apparatus with an integrated level-wind, a sensor deployment and recovery apparatus with an integrated level-wind, and line deployment and recovery system with an integrated level-wind are not limited to the particular embodiments described herein, but is capable of many embodiments without departing from the scope of the claims.

What is claimed:

1. A line deployment and recovery apparatus with an integrated level-wind, comprising:
   a reel, having an external surface with helical grooves, wherein the grooves facilitate a line;
   a motor configured to axially rotate the reel;
   a level-wind shuttle, further comprising:
      a fairlead configured to selectively feed the line into the helical grooves, or deploy the line from the helical grooves;
      a shuttle finger configured to align the shuttle with the helical grooves and receive a driving force from the reel's rotations to drive the shuttle; and
   a shuttle track, oriented parallel to the reel fixed in an offset position form the helical grooves at an operable track height, configured to facilitate linear traversal of the shuttle along the reel.

2. The line deployment and recovery apparatus of claim 1, wherein the motor is the only motor providing level-wind functionality.

3. The line deployment and recovery apparatus of claim 1, the reel further comprising
   an internal cavity, wherein the motor is fixed the internal cavity.

4. The line deployment and recovery apparatus of claim 1, wherein the motor is external to the cavity of the reel.

5. The line deployment and recovery apparatus of claim 1, wherein the reel, the shuttle track, and the shuttle consist of plastics.

6. The line deployment and recovery apparatus of claim 1, wherein the shuttle finger is pitched optimally to interface with the screw.

7. The line deployment and recovery apparatus of claim 1, further comprising
   a flotation device coupled to the reel configured to provide buoyancy in submerged applications.

8. A sensor deployment and recovery apparatus with an integrated level-wind, comprising:
   a cylindrical drum, having an external surface with helical grooves, wherein the grooves facilitate a linear sensor array;
   a single motor configured to axially rotate the cylindrical drum, wherein the single motor is the only motor providing level-wind functionality;
   a level-wind shuttle, further comprising:
      a fairlead configured to selectively feed the linear sensor array into the helical grooves or deploy the linear sensor array from the helical grooves,
      a shuttle finger configured to align the shuttle with the helical grooves and receive a driving force from the cylindrical drum's rotations to drive the shuttle; and
   a shuttle track, oriented parallel to the drum and fixed in an offset position form the helical grooves at an operable track height, configured to facilitate linear traversal of the shuttle along the cylindrical drum.

9. The sensor deployment and recovery apparatus with an integrated level-wind of claim 8, further comprising
   a plurality of sensors coupled to the shuttle, configured to spool around the drum.

10. The sensor deployment and recovery apparatus with an integrated level-wind of claim 8, the drum further comprising
   an internal cavity, wherein the motor is fixed the internal cavity.

11. The sensor deployment and recovery apparatus with an integrated level-wind of claim 8, wherein the motor is external to the cavity of the drum.

12. The sensor deployment and recovery apparatus with an integrated level-wind of claim 8, wherein the drum, the shuttle track, and the shuttle consist of plastics.

13. The sensor deployment and recovery apparatus with an integrated level-wind of claim 8, wherein the shuttle finger is pitched optimally interface with the screw.

14. The sensor deployment and recovery apparatus with an integrated level-wind of claim 8, further comprising
   a flotation device coupled to the cylindrical drum configured to provide buoyancy in submerged applications.

15. A sensor deployment and recovery system with an integrated level-wind, comprising:
   a linear sensor array;
   a cylindrical drum, having an external surface with helical grooves, wherein the grooves facilitate the linear sensor array;
   a single motor configured to axially rotate the cylindrical drum;
   a level-wind shuttle, further comprising:

a fairlead configured to selectively feed the linear sensor array into the helical grooves or deploy the linear sensor array from the helical grooves, a shuttle finger configured to align the shuttle with the helical grooves and receive a driving force from the cylindrical drum's rotations to drive the shuttle; and a shuttle track, oriented parallel to the drum and fixed in an offset position form the helical grooves at an operable track height, configured to facilitate linear traversal of the shuttle along the cylindrical drum.

16. The sensor deployment and recovery system with an integrated level-wind of claim 15, the drum further comprising an internal cavity, wherein the motor is fixed the internal cavity.

17. The sensor deployment and recovery system with an integrated level-wind of claim 15, wherein the motor is external to the cavity of the drum.

18. The sensor deployment and recovery system with an integrated level-wind of claim 15, wherein the drum, the shuttle track, and the shuttle consist of plastics.

19. The sensor deployment and recovery system with an integrated level-wind of claim 15, wherein the shuttle finger is pitched optimally interface with the screw.

20. The sensor deployment and recovery system with an integrated level-wind of claim 15, further comprising:

a flotation device coupled to the cylindrical drum configured to provide buoyancy in submerged applications.

\* \* \* \* \*